Figure 1:
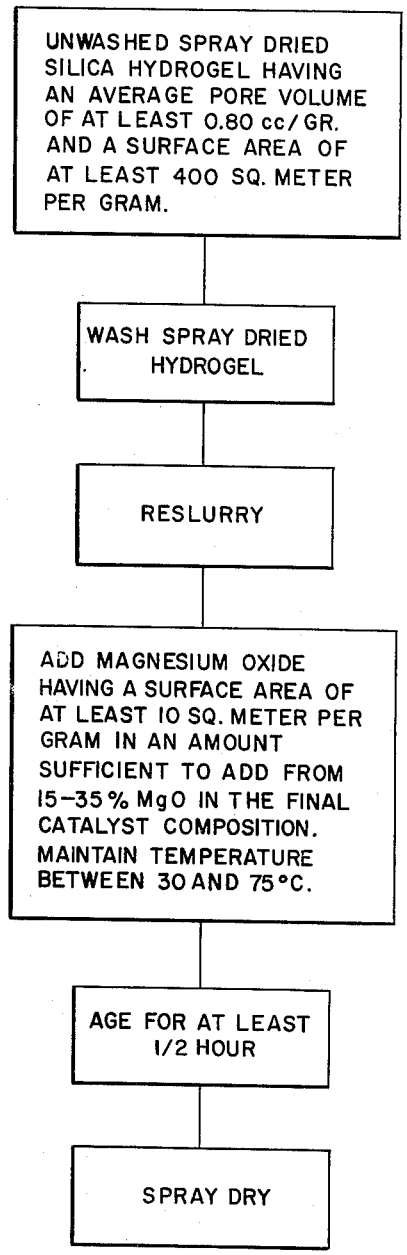

June 13, 1961     W. B. INNES ET AL     2,988,521
PROCESS FOR PREPARING A SILICA-MAGNESIA CATALYST
Filed Nov. 19, 1957     3 Sheets-Sheet 1

FIG.—1

INVENTORS
WILLIAM B. INNES
MALDEN W. MICHAEL
JOHN D. PENNELL
NICHOLAS CHOMITZ
BY
ATTORNEY 2,988,521
PROCESS FOR PREPARING A SILICA-MAGNESIA CATALYST
William B. Innes, Malden W. Michael, and John D. Pennell, Stamford, Conn., and Nicholas Chomitz, Yonkers, N.Y., assignors to American Cyanamid Company, New York, N.Y., a corporation of Maine
Filed Nov. 19, 1957, Ser. No. 697,377
4 Claims. (Cl. 252—457)

The present invention relates to an improved silica-magnesia catalyst and to the process for preparing the same.

Silica-magnesia catalysts have long been known for use in the conversion of hydrocarbon oils, as for example, the cracking of gas oil into high-knock rating gasoline, and are known to possess certain advantages in such cracking operations, principal among which was the production of larger portions of gasoline in relation to the production of fixed gases, as for example, the C-1 through C-4 gases, and carbon.

While the above set forth advantages are highly desirable, the silica-magnesia catalysts prepared according to prior art procedures were possessed of shortcomings, not the least of which was the difficulty in regeneration. This resulted in termination of commercial usage. Various efforts have been made heretofore to overcome this difficulty. For example, various procedures have been developed to enlarge the pore diameter of the catalyst by the use of steam and pressure. However, such processes were not commercially attractive and in addition, while to some extent improving regenerability to a slight degree, resulted in drastic activity decline. Further, these and other prior commercial silica-magnesia cracking catalysts, although giving high gasoline yield, had carbon factors no better than silica-alumina cracking catalysts, and in many instances were poorer.

Accordingly, it is an object of the present invention to provide a silica-magnesia cracking catalyst having an improved carbon burning rate or a catalyst which may be more readily regenerated.

It is a further object to produce a high pore volume catalyst.

It is a further object of the present invention to provide a silica-magnesia cracking catalyst having improved stable activity, improved and lower carbon factor, and improved and lower gas factor.

It is still another object of the present invention to provide a silica-magnesia cracking catalyst capable of producing improved and higher gasoline yields.

It is a particular and special object of the present invention to provide a silica-magnesia cracking catalyst possessed of narrower particle size distribution, which narrow and more uniform particle size distribution is reflected in better carbon burning rate and more uniform unit life of the catalyst.

It is a still further object to provide a process for preparing such a catalyst which is readily adaptable to commercial scale plant equipment for catalyst production in commercial quantities.

These and other objects and advantages of the present invention will become apparent from the detailed description of the invention set forth hereinbelow.

According to the present invention, a process is provided for preparing a magnesia-activated silica fluid cracking catalyst which comprises reslurrying in water a spray-dried silica gel having an average pore volume of at least 0.8 cc. per gram and a surface area of at least 400 square meters per gram, and adding thereto at a temperature of from between 30 and 75° C. an amount of magnesium oxide sufficient to provide in the final catalyst between 15 and 35% of said magnesium oxide. This catalyst composition is then aged for at least ½ hour, and thereafter dried. Preferably, drying of the final catalyst is carried out rapidly, as by means of a spray drier or flash-drying equipment.

It is a feature of the present process that the silica gel be spray dried or otherwise rapidly dried prior to washing and reslurrying preliminary to the coating or reacting with magnesium oxide, in order to insure a fluid catalyst product having the improved activity and regenerability as well as other characteristics noted above.

By so drying the silica gel preliminary to washing, reslurrying and coating, the necessary pore volume and surface area of a silica can be kept within desired limits. In addition, and very important practically, substantially less wash water is employed, and as a consequence less wash time is required. Further, it has been found that the washing of the spray-dried gel more readily results in more complete removal of sodium oxide and other undesirable materials which, if present are deleterious to the final catalyst material.

In order that the final silica-magnesia catalyst possess the desired activity and regerability characteristics, it is essential that it have an average pore volume of at least 0.8 cc. per gram and a surface area of at least 400 square meters per gram, by the B.E.T. method after calcination for one hour at 1100° F. It should be emphasized that these characteristics relating to average pore volume and surface area are minimum values. Thus, for example, the average pore volume will be a value substantially in excess of 0.80 cc. per gram, as for example, 1.0, 1.20 and the like. The same is true with respect to surface area of the silica base, which may be a value of 500, 600, 700 or more square meters per gram (m.$^2$/g.). In order to provide such a silica base, it has been determined that certain variables in the process for preparing the silica hydrate, such as the length of time of the strike, the pH of the strike, strike solids, and ageing times and temperatures, are considered to be important; for it is through the control of these variables that a hydrogel capable of being converted to a silica xerogel having the essential physical characteristics after spray drying or other suitable and equivalent drying procedures can be prepared. A suitable and illustrative method of the preparation of such a gel will be set forth in detail hereinafter.

While it has been indicated hereinabove that it is preferable to wash the spray-dried xerogel material in contrast to washing of the hydrogel, it should be noted that the hydrogel may be washed prior to spray drying by the employment of conventional rotary filter type apparatus, and while more difficult and time-consuming, undesirable catalyst poisons, as for example, sodium oxide or sodium sulfate, may be removed therefrom by this means.

The washed, spray-dried hydrogel or xerogel is then prepared for coating with the magnesium oxide. This is done by reslurrying the washed xerogel to a solids content of at least 5%, although higher solids content of from between 15–20% is preferred, and adding thereto sufficient magnesium oxide to provide a final product having from between 15 and 35% magnesium oxide and preferably from between about 18 and 30% of magnesium oxide. It is important that the magnesium oxide added should be in a finely divided state and should have a surface area of 5 or more and preferably at least 10 square meters per gram, while the optimum is from between about 20 and 50 square meters per gram. However, magnesia having a surface area of 100 or 200 square meters per gram may be employed with good success. During the addition, the temperature of the reaction medium should be from between 30 and about 75° C. and preferably from between 40 and 55° C. Addition of the magnesium oxide is preferably carried out and the reaction mixture aged for a period of time of at least ½ hour. Preferably, ageing is carried out for from 2 to 10 hours, although ageing periods of time up to 25 hours, while not considered practical, have provided satisfactory results.

It should be noted here that some of the ageing time may be consumed through the slow addition of the magnesium oxide to the reslurried xerogel. This has the advantage, particularly when operating at higher temperatures, as for example, those above 55° C. in that the slow addition tends to avoid the formation of magnesium hydroxide or the hydration of the magnesium oxide, which product reacts significantly more slowly than does the oxide with the xerogel catalyst base. If slow addition time is to be included in ageing time, times from between about 15 minutes to about 3½ hours may be employed for the addition of the magnesium oxide, plus an additional period of time, at least about 15 minutes, to age the composition after the final charge of the magnesium oxide. Thus, in accordance with the present specification, when the expression "ageing the catalyst composition" is employed, it is intended to include ageing during addition as well as ageing subsequent to the addition of the magnesium oxide.

At the conclusion of the ageing period, the catalyst composition may, if desired, be filtered and then dried. While preferably the drying of the final catalyst composition is carried out rapidly, as by spray or flash drying or other equivalent techniques, in order to provide a final characteristic having optimum improved stability and regenerability, as well as other characteristics, the final catalyst material may be dried by other techniques, as for example, by tray drying. Tray-dried catalysts have poorer stability than those rapidly dried as by spray drying, but are satisfactory with respect to many properties, as will be seen more clearly hereinbelow.

As noted, spray drying of the catalyst composition is a preferred means of rapidly drying said composition because large amounts of material may be processed in relatively short periods of time. Spray drying techniques can increase the ignited solids content of the catalyst composition to form between 60 and 88%. Any suitable spray drier may be used. One that has been employed with good results is described in U.S. Patent No. 2,644,516, dated July 7, 1953. Although gas inlet temperatures up to 1300° F. have been used successfully, the temperature of the drying gases entering the spray drying chamber is preferably controlled within the range of about 500 to 1000° F. so that the silica-magnesia catalyst composition will be converted into a set partially dehydrated rigid gel during the drying procedure. In order to further increase the solids content and to insure conversion of the catalyst composition to its most active form, the dried catalyst, if desired, may be calcined by heating to a temperature of from between 1250° F. and 1350° F. during periods of time of from about 2 to 4 hours.

The final catalyst of this invention is characterized in its freshly prepared state by a surface area of at least 500 square meters per gram, an average pore volume of at least .50 cc. per gram and an average pore diameter of at least 35 Angstroms (A.), among other characteristics.

An embodiment of the present invention will now be described in greater detail with reference to Fig. 1 of the accompanying drawings, which is a flow sheet illustration of a specific embodiment thereof. Illustrative FIGURES 2 and 3 will be described more fully hereinafter.

Referring to the flow sheet, it will be seen that an unwashed, spray-dried silica gel or xerogel having a surface area of at least 400 square meters per gram and a pore volume of at least 0.8 cc. per gram is employed as a starting material in the preparation of the catalyst composition in accordance with the present invention.

Spray dried silica gel base material of the type contemplated for use as starting materials in the present invention may be prepared by reacting stoichiometrically equivalent amounts of sodium silicate with sulfuric acid at a temperature of between 40 and 80° C. so as to produce a slurry of hydrated silica containing from between 3 and 10% silica or $SiO_2$. This hydrated silica may be aged for at least ½ hour at a pH of between 2 and about 8, acidified to a pH of between 2 and 4, and spray dried.

The spray-dried silica gel is then washed to reduce the sodium content to an acceptable level (below 0.02%) and to remove acid or soluble salts therefrom. It is then reslurried and an amount of active magnesium oxide sufficient to provide from between 15 and 35% magnesium oxide in the final catalyst composition, having a surface area of 5 or more, and preferably at least 10 square meters per gram, is added thereto at a temperature of from between 30 and 75° C. This catalyst composition is then aged for at least ½ hour.

Thereafter, the coated, washed and spray-dried silica gel is spray dried or otherwise rapidly dried, as by flash drying, to produce the final catalyst composition.

As pointed out hereinabove, this catalyst composition may generally be classified as a high pore volume gel having relatively stable activity, good regenerability, improved carbon burning rate, lower carbon factor and lower gas factor than the silica-magnesia catalyst prepared heretofore.

In order that the present invention may be more fully understood, the following examples are given primarily by way of illustration. No details contained therein should be construed as limitations on the present invention, except as they appear in the appended claims. All parts and percentages are by weight unless otherwise specifically designated.

EXAMPLE 1

(A) 700 parts of N brand sodium silicate and 2900 parts of water were added to a suitable reaction vessel and 400 parts of a 25% sulfuric acid solution added thereto with continuous agitation at a temperature of 75° C. The addition of the sulfuric acid took place over a 15-minute time span. The resulting silica hydrogel or hydrated silica gel was aged for 1 hour, filtered and spray dried. Sufficient sulfuric acid was added prior to spray drying to adjust the pH to 4 prior to spray drying. The solids content of the silica gel slurry was about 5% and the pH of the hydrogel slurry during ageing was approximately 7.

The resulting spray-dried silica gel had a surface area of about 543 square meters per gram and a pore volume or 1.02 cc. per gram.

(B) The spray-dried silica gel prepared in accordance with the process of A above was washed to reduce the sodium ion content and possible free acid and soluble salts occluded therein to an acceptable level. Normally, such washing results in the reduction of sodium present as $Na_2O$ to less than .02%, based on the total catalyst composition.

It should be pointed out herein that the washing of the spray-dried silica hydrogel results in a distinct advantage in the amount of water employed and the time employed over normal filtering and washing procedures required to free the silica of such poisons. Thus, only from between about 20 to 30% of the amount of water normally required to wash a silica hydrogel in conventional vacuum filtration apparatus is required by washing the spray-dried silica hydrogel or xerogel.

(C) 27 parts of magnesium oxide having a surface area of 25 square meters per gram were added to the reslurried, washed, spray-dried hydrogel prepared as above, over a 20-minute period at a temperature of 50°

C. Continuous agitation was employed during the addition and the composition was allowed to age for 4 hours at this temperature.

The aged silica-magnesium oxide catalyst composition was then spray dried. The final catalyst composition contained 25% MgO by weight and the remainder was silica.

The final catalyst had a surface area of about 600 square meters per gram, an average pore volume of about 0.70 cc. per gram and an average pore diameter of 48 Angstroms.

In the following table, Table I, typical catalysts prepared in accordance with the process of the present invention, as it is generally set forth hereinabove, are compared with three commercially available cracking catalysts. The first of these is identified as Catalyst A and is a 13% alumina, silica-alumina spray-dried catalyst. Catalyst B is a 25% alumina, silica-alumina spray-dried catalyst; Catalyst C is a typical catalyst prepared in accordance with the present invention containing 25% MgO by weight, in which the final catalyst is tray dried; Catalyst D is a typical catalyst prepared in accordance with a preferred embodiment of this invention in which the final catalyst composition is spray dried; and Catalyst E is a commercial silica-magnesia catalyst containing 30% MgO by weight.

The AGC activity, gas factor and carbon factor values recorded in Table I are determined in accordance with the procedure described in "The Cyanamid Manual of Test Methods" prepared by the Refinery Chemicals Department of the American Cyanamid Company, copyright 1957.

The carbon burning rate constant is the first order reaction rate constant (measured in reciprocal minutes) determined by measurement of carbon burning rate as a function of time at 1050° F. and 1.20 atmospheres of dry air. The higher the value, the shorter time period required to burn a given fraction of initial carbon, and is therefore a measure of the ease of regeneration. This method is described in detail in an article authored by Dr. R. G. Haldeman.

Table I
COMPARISON OF CATALYST TYPES

| | Cat. A | Cat. B | Cat. C | Cat. D | Cat. E |
|---|---|---|---|---|---|
| AGC Activity: | | | | | |
| Fresh | 110 | 110 | 65 | 63 | 67 |
| Steamed, 715° C | 29 | 38 | 38 | 50 | 45 |
| Gas Factor: | | | | | |
| Fresh | 1.10 | 1.08 | .96 | .95 | 1.0 |
| Steamed, 715° C | 0.96 | 1.06 | .80 | .80 | .95 |
| Carbon Factor: | | | | | |
| Fresh | 1.00 | 1.15 | .96 | .90 | .95 |
| Steamed, 715° C | 0.98 | 1.12 | .75 | .80 | .90 |
| Average Pore Diameter (Angstroms) | 52 | 68 | 35 | 44 | 26 |
| Surface Area, m.²/g., Fresh | 550 | 525 | 600 | 650 | 534 |
| Average Pore Volume, cc./g | .70 | .90 | .53 | .70 | .35 |
| Weight percent gasoline yield at 50% conversion | 33 | 33 | 39 | 39 | 38 |
| Carbon burning rate constant, 1,050° F. 1.2 atmospheres of dry air min.⁻¹: | | | | | |
| Fresh | .31 | | .45 | .37 | .21 |
| Steamed | .31 | | .23 | .25 | .15 |

The above table clearly indicates that the typical catalysts prepared in accordance with the present invention are superior with respect to their activity, after regeneration as determined by steaming at 715° C., gas factor, carbon factor, and carbon burning rate, when compared with competitive silica-alumina catalysts and compared with a commercial silica-magnesia catalyst.

In addition, the average pore volume of the freshly prepared silica-magnesia catalysts of the present invention and their average pore diameter are substantially larger respectively than the average pore volume and average pore diameter of the commercial silica-magnesia catalyst. These physical characteristics of the catalyst materials of this invention are believed to be a prime factor for the good regenerability of the catalyst of this invention and its stable activity through repeated regeneration.

The relationship between average pore diameter, average pore volume and surface area for a given catalyst has been expressed as:

$$PD \text{ (pore diameter)} = 4[V \text{ (pore volume)}/S \text{ (surface area)}] \times 10^4$$

wherein the pore diameter is measured in Angstroms (A.), the pore volume is measured in cc. per gram and the surface area is measured in square meters per gram.

In order to illustrate the significance of coating a spray-dried silica hydrogel with magnesium oxide, Table II has been prepared. In Table II, the silica-base portion of Catalysts F and G were prepared by the addition of sulfuric acid to sodium silicate solutions, and are thus identified as alkaline strikes, which were carried out at the temperatures indicated. Other conditions employed were similar to those employed in Example 1. These materials were then washed or filtered to remove sodium and sulfate ions, and magnesium oxide in the amount indicated and at the temperature and pH indicated was added thereto. The principal difference to be illustrated in Table II is that the coating was carried out on a hydrogel rather than a spray-dried silica hydrogel or xerogel.

Table II

| | pH After MgO Reaction | Percent MgO Added | Percent MgO Found | Area M.²/gm. Fresh | Pore Volume, cc./gm. Fresh | AGC Activity Fresh | AGC Activity Steam 700° C. | AGC Activity Steam 715° C. |
|---|---|---|---|---|---|---|---|---|
| Catalyst D | | 27 | 25 | 650 | .70 | 63 | | 50 |
| Catalyst F—Alkaline strike, 50° C. Add MgO at pH 3. Age 4 hours at 80° C. Filter, wash and tray dry | 7 | 25 | 22 | 544 | .58 | 31 | | |
| Catalyst G—Alkaline strike, 50° C. Wash by decantation. Add MgO, age 3 hours at 80° C. Dewater and tray dry | 7 | 25 | 22 | 416 | .51 | 78 | 49 | |

It will be seen from Table II that when the silica hydrogel is coated rather than the xerogel in accordance with the present invention, either the initial activity or stability of the catalyst is significantly poorer than that prepared in accordance with the present invention. With respect to Catalyst G, it should further be noted that washing by decantation is not as practical, in view of the excessively large volumes of water required, tankage equipment, and the like.

An important aspect of the present invention resides in the relationship between the surface area of the spray-dried, washed silica gel and the coating temperature employed during the reaction between the silica base and the finely divided magnesium oxide. Surprisingly, the relationship provides a method of controlling the particle size of the final catalyst composition and results in a means whereby narrow particle size distribution is readily achieved, which property is reflected in a better carbon burning rate for the catalyst composition and a more uniform cracking unit life.

Generally, it may be said that the higher the surface area employed during the coating operation the lower the temperature that should be employed, and the lower the surface area of the silica base the higher the temperature necessary during the "coating," in order to effect the combination of magnesia with silica, and realize maximum activity, stability and selectivity.

A "coating" temperature of 50° C. normally results in selective splitting of spheroidal particles over about 70 microns into hemispheres on rapid drying, such as obtained by use of a spray or flash drier. This results in a narrow particle size distribution, which is generally preferred in fluid cracking because coarse catalyst tends to remain in cracking units for longer than optimum time prior to loss by attrition. Long residence time in a fluid catalytic unit leads to low activity and high metals contamination, which in turn results in poorer product distribution. Also, coarse catalyst is more difficult to regenerate than fine catalyst because of diffusion considerations.

At "coating" temperatures over 65° C. fragmentation of particles on final drying is excessive, if done by a rapid drying process, so that it is usually desirable to maintain the coating temperature at 65° C. or lower.

This method of controlling particle size results in the process of this invention producing a final fluid catalyst containing on a weight percent basis less than 10% (and, in most instances, less than 5%) of the particles being coarser than 80 microns and in a product containing on a weight percent basis from between 55 and 90%, between 40 and 80 microns.

With respect to commercial silica-alumina cracking catalyst containing either 13 or 25% of alumina, these catalyst materials normally contain on an average from between 15 and 20% by weight of particles coarser than 80 microns. Thus, the net effect of the present process is to provide a ready method of producing a catalyst composition containing an optimum percent of the catalyst material within the desired 40 to 80 micron range and a minimum percent of fines in relation to commercial cracking catalysts. These figures have been determined by employing the CAE-Sieve method, reference to which may be found, among other places, in "The Cyanamid Manual of Test Methods" prepared by the Refinery Chemicals Department of the American Cyanamid Company, copyright 1957.

In order to illustrate the relationship between silica base and coating temperature, Table III hereinbelow has been prepared. In the said table, the particle size distributions for the silica base materials are for silica bases possessed of at least the minimum physical characteristics employable in this invention, and the coating procedure is carried out in accordance with the present invention. In general, it will be observed, both with respect to spray-dried and tray-dried catalyst compositions, that satisfactory particle size distribution can be obtained while operating within the temperature ranges of the present invention, but when temperatures above 75° C. are employed in coating, that the particle size distribution drops below commercially acceptable limits and as such are undesirable.

Table III

| Catalyst | Final Drying | +80μ | −40μ | 40-80μ |
| --- | --- | --- | --- | --- |
| Silica-alumina | spray | 18 | 18 | 64 |
| Silica base | do | 10 | 18 | 72 |
| Silica magnesia catalyst: | | | | |
| 40° C. coating | do | 10 | 22 | 68 |
| 50° C. coating | do | 1 | 22 | 77 |
| 65° C. coating | do | 1 | 42 | 57 |
| 80° C. coating | do | 0 | 81 | 29 |
| Silica base | do | 18 | 24 | 58 |
| Silica magnesia catalyst: | | | | |
| 65° C. coating | tray | 4 | 26 | 70 |
| 75° C. coating | do | 4 | 41 | 55 |
| 80° C. coating | do | 1 | 50 | 49 |

Figure 2:
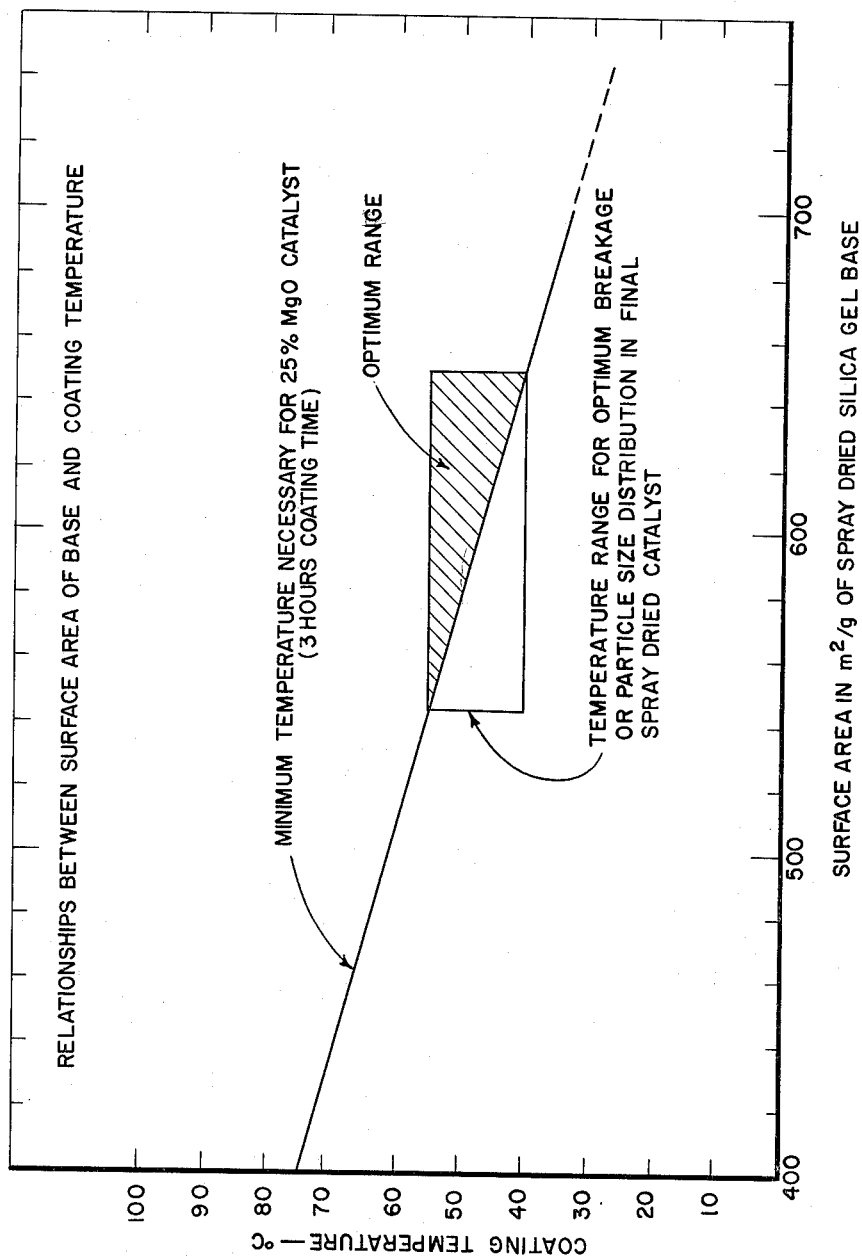

The relationship between the surface area of the silica base and the temperature of coating or reaction between silica base and magnesium oxide is illustrated graphically in FIG. 2 of the accompanying drawings. This relationship is illustrated for catalysts having an AGC activity of at least 50. The magnesia employed had a surface area of 25 m.$^2$/g. By referring to FIG. 2, it will be seen that the coating temperature increases as the surface area of the silica base decreases. Further, it will be seen that in the temperature range between 40 and 55° C. optimum breakage of large particles occurs and that the combination of these factors defines an optimum range as shown in this figure. A similar pattern is found when the final drying is by a slower process, as by tray drying, except that the optimum temperature range is then between 45 and 65° C.

Figure 3:
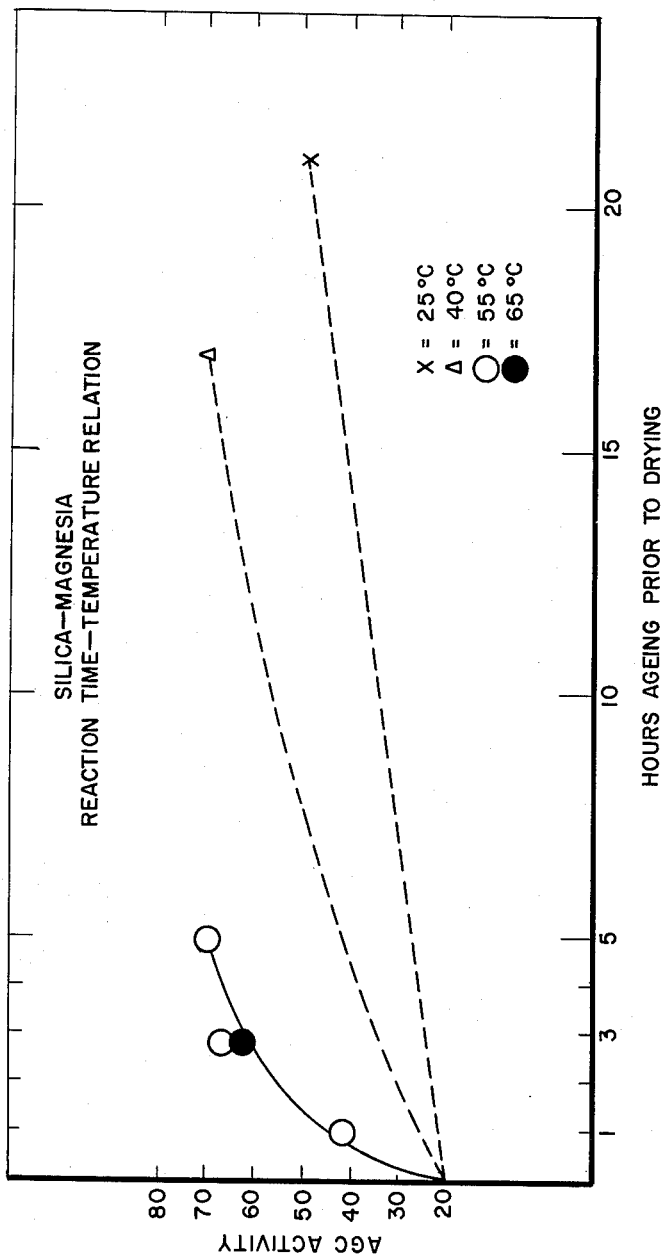

In accordance with the present invention, the relationship between ageing time and ageing temperature conditions is illustrated in FIG. 3 of the accompanying drawings, with respect to the AGC activity of the catalyst.

By referring to FIG. 3, it may be said that the higher the ageing temperature, the shorter the time of ageing required to produce a catalyst of commercially acceptable AGC activity of at least 50. It will further be seen that at temperatures of less than 30° C. the time period for effecting such activity is excessive and within practical limits non-commercial.

The catalyst prepared in FIG. 3 contained 25% magnesia and had an average pore volume of about .50 cc. per gram and a surface area of 552 square meters per gram. The magnesia had a surface area of about 25 m.$^2$/g. The spray-dried silica base employed had a surface area of 543 square meters per gram and an average pore volume of 1.02.

A further important aspect of the present invention relates to the drying of the catalyst composition. As has been noted hereinabove, it is preferred to rapidly dry the final catalyst composition, as by spray drying, in that the final catalyst is, among other things, more stable because of wider average pore volume, but catalysts dried by other techniques, as for example, tray dried, are generally satisfactory. In order to illustrate the significance of the rapid drying of the final composition as a means of providing a catalyst having superior average pore volume, Table IV is incorporated in the present specification. In Table IV, Catalysts H-K were prepared in accordance with the process of the present invention. This silica base was a spray-dried material having a surface area of at least 400 m.$^2$ per gram and a pore volume of at least 0.8 cc. per gram. These base materials were then coated in accordance with the present invention.

Table IV

| Catalyst | Pore Volume | |
| --- | --- | --- |
| | Tray | Spray |
| H | 0.59 | .76 |
| I | 0.55 | |
| J | 0.60 | .79 |
| K | 0.57 | .88 |

The above table illustrates the significance of spray drying the final catalyst material as a preferred means of drying the final catalyst in accordance with the present invention. Thus, when the catalyst is spray dried, substantial improvement in pore volume is obtained, which characteristic is reflected in stability of activity.

Other activating metals, as for example, thoria, berillia, zirconia and alumina, may be employed in the catalyst of this invention. These materials are normally employed in amounts of less than 5%, based on the total catalyst composition.

We claim:

1. A process for preparing a fluid, magnesia activated silica catalyst characterized by a narrow particle size distribution and having less than 10% of the particles over 80 microns in size, which comprises reslurrying spray dried silica gel having an average pore volume of at least 0.8 cc. per gram and a surface area of at least 400 sq. meters per gram, reacting magnesium oxide having surface area of at least 5 sq. meters per gram with said reslurried silica gel for at least ½ hour at a temperature of from between about 40° C. and about 65° C., said magnesium oxide being employed in an amount sufficient to provide from between 15 and 35% of magnesium oxide in the final catalyst composition, and thereafter rapidly drying the catalyst material.

2. A process for preparing a fluid, magnesia activated silica catalyst characterized by a narrow particle size distribution and having less than 10% of the particles over 80 microns in size, which comprises washing and reslurrying in water a spray dried silica gel having an average pore volume of at least 0.8 cc. per gram and a surface area of at least 400 sq. meters per gram, adding magnesium oxide having a surface area of at least 10 sq. meters per gram to said reslurried silica gel, ageing said silica gel and magnesium oxide catalyst composition for at least ½ hour at a temperature of between about 40° C. and about 65° C., said magnesium oxide being added in an amount sufficient to provide from between 15 and 35% magnesium oxide in the final catalyst composition and thereafter rapidly drying the catalyst material.

3. A process for preparing a fluid, magnesia activated silica catalyst characterized by a narrow particle size distribution and having less than 10% of the particles over 80 microns in size, which comprises washing and reslurrying said gel in water to provide a slurry containing from between 10% and 20% solids, reacting said reslurried gel with magnesium oxide having a surface area of at least 10 sq. meters per gram at a temperature of between about 40° C. and about 65° C. for from between 2 and 10 hours, and thereafter spray drying the catalyst composition, said magnesium oxide being employed in an amount to provide from between 15% and 35% magnesium oxide based on the weight of the final catalyst composition.

4. A process according to claim 3 in which the silica gel-magnesium oxide reaction temperature is from between 40° C. and 55° C. and the amount of magnesium oxide employed is sufficient to provide from between 18 and 30% magnesium oxide based on the weight of the final catalyst composition.

References Cited in the file of this patent

UNITED STATES PATENTS

| | | |
|---|---|---|
| 2,435,158 | Read | Jan. 27, 1948 |
| 2,582,099 | Braithwaite | Jan. 8, 1952 |
| 2,605,237 | Webb | July 29, 1952 |
| 2,785,051 | Miller | Mar. 12, 1957 |